United States Patent [19]

Romanchev et al.

[11] Patent Number: 5,442,971
[45] Date of Patent: Aug. 22, 1995

[54] MECHANISM FOR TRANSFORMING ROTARY MOTION OF A SHAFT INTO TRANSLATIONAL MOTION OF ACTUATING MEMBERS

[75] Inventors: Jury A. Romanchev; Vadim F. Kutenev; Sergei S. Istomin; Mikhail A. Zlenko; Boris V. Kvasnikov, all of Moscow,

[73] Assignee: Tsentralny Nauchno-Issledovatelsky Avtomobilny I Avtomotorny Institut, Moscow,

[21] Appl. No.: 78,162

[22] Filed: Oct. 13, 1993

[51] Int. Cl.⁶ .................. F02B 75/26; F16H 21/50; F16H 57/04
[52] U.S. Cl. .......................... 74/53; 74/559; 123/564; 184/6.12
[58] Field of Search .............. 74/53, 55, 559, 467; 123/58 BA, 58 BB, 56.4

[56] References Cited

U.S. PATENT DOCUMENTS

| 1,819,137 | 8/1931 | Thompson | 123/58 BA |
| 2,278,696 | 4/1942 | George | 123/58 BB |
| 4,630,711 | 12/1986 | Levrai et al. | 184/6.12 |
| 4,736,715 | 4/1988 | Larsen | 123/58 BB X |

FOREIGN PATENT DOCUMENTS

| 1256473 | 12/1967 | Germany. |
| 3420529 | 12/1985 | Germany. |
| 3800005 | 7/1988 | Germany. |
| 1209907 | 2/1986 | |
| 591597 | 5/1978 | U.S.S.R.. |

Primary Examiner—Allan D. Herrmann
Attorney, Agent, or Firm—Ladas & Parry

[57] ABSTRACT

A 7-cylinder axial-piston internal combustion engine has a casing (33) intended for connection with a cylinder block (2). Formed in the casing (33) coaxially with shaft (11) is a cavity which receives a drive gear 41 on an end of the shaft (11). The drive gear (41) is in mesh with a gear wheel (42) installed in the casing (33) and kinematically connected to a ring-shaped member (68) having external radial projections (71, 72) and an internal ring gear (83). The member (68) is kinematically connected to actuating members. A zone A of engagement of the drive gear (41) with the gear wheel (42) communicates with a header (54) for oil supply. A zone B outside the engagement of the drive gear (41) with the gear wheel (42) communicates with a source of lubrication.

6 Claims, 7 Drawing Sheets

MECHANISM FOR TRANSFORMING ROTARY MOTION OF A SHAFT INTO TRANSLATIONAL MOTION OF ACTUATING MEMBERS

FIELD OF THE INVENTION

The present invention relates to mechanical engineering and, more particularly, to a mechanism for transforming rotary motion of the shaft into translational motion of actuating members.

BACKGROUND OF THE INVENTION

At present the automotive industry is one of the most dynamically develping industrial branches; therefore, specialists constantly apply to non-traditional arrangements of engines and, in particular, to piston engines with an axial arrangement of cylinders. The advantages of the axial arrangement of cylinders in piston engines, bringing about smaller mass and overall dimensions of the engine, are well known. In relation to traditional piston engines with a crank mechanism for transforming the reciprocating motion of pistons into rotation of the crankshaft, the overall dimensions and mass of axial-piston engines are reduced 1.5–2.0 times, and conditions are provided for decreasing aerodynamic resistance of the vehicle owing to a decrease of the space occupied by the engine under the hood. However, the dimensions of the engine which occupies the space under the hood include, in particular, a pump that ensures lubrication of the engine and its accessories and made as a mounted unit. When this pump is made as an independent unit, it results in an increase of the engine mass, because the pump has its body and, besides, pipelines are necessary for feeding lubricant to the engine units and accessories. The provision of these pipelines, oil feed and outlet ducts and their joints brings about additional losses of energy for forcing the oil through them, which affects adversely the service life of both the engine and its units, particularly of the mechanism for transforming the rotation of the axial-piston engine shaft into the translational motion of stems of intake and exhaust valves.

Up to the present time, there is no reliable and durable design of the axial-piston engine, and there were rare attempts to create a durable design of the mechanism for transforming the rotary motion of its shaft into the translational motion of intake and exhaust valve stems.

Attempts to solve the problem of providing reliable operation of the axial-piston engine have resulted in the creation of an axial-piston machine (application DE, No. 3420529 A₁).

The frame of the known machine houses a cylinder block with cylindrical cavities whose axes are parallel to the shaft longitudinal axis. The cavities accommodate pistons which can reciprocate therein, each whereof is hinged to one end of the connecting rod, whose other end is hinged to a swash plate. The latter is installed via a support on an inclined journal of the shaft mounted on supports installed in the frame. The swash plate is connected by a universal joint with the frame. The swash plate support on the shaft inclined journal is made spherical, which fact ensures swinging of the swash plate in the process of transforming the reciprocating motion of pistons into the rotary motion of the shaft.

Said application contains attempts of structural improvement of untis and accessories of the axial-piston engine and, in particular, of such vitally important unit thereof as the valve gear. The rotary motion of the shaft of the axial-piston machine in this case is transformed into the translational motion of intake and exhaust valve stems. The cavity of the transforming mechanism frame houses a drive gear whose teeth are cut on the crankshaft. The drive gear is meshed with a gear wheel which is installed in the frame on its own shaft. The latter is fitted with a gear which is in mesh with a wheel installed on the output shaft of the ignition system distributor drive reduction gear. A ring-shaped member is provided in the mechanism for transforming the shaft rotary motion into translational motion of valve stems of the axial-piston engine. The ring-shaped element is installed in the frame coaxially with the drive gear with a provision for rotating about its axle. Uniformly arranged on the inner surface of the ring-shaped member are radial profiled projections mating with its inner cylindrical surface and lying in the plane perpendicular to axis of the ring-shaped member. Each projection interacts with a roller connected to one arm of a double-arm lever, whose pin is fixed in the frame perpendicularly to the ring-shaped member axis. The other arm of the double-arm lever is intended for interaction with an actuating member, namely, with a valve stem, along its end face surface. The mechanism provides for a kinematic linkage of the gear wheel with the ring-shaped member. This linkage is constituted by engagement of the gear wheel teeth with the teeth made on the inner surface of the ring-shaped member.

This mechanism ensures transformation of the rotary motion of the crankshaft into translational motion of pistons of a seven-cylinder axial-piston machine. The gear ratio which depends on the number of cylinders and is ensured by the gearing of the mechanism increases along with the increase of the number of cylinders. Accordingly, there the pitch circle of the teeth made on the ring-shaped member also increases, which fact hampers the layout of the axial-piston engine.

Arrangement of projections on the ring-shaped member in one plane fails to provide the required valve timing angles. Operation of the motion-transforming mechanism is insufficiently reliable owing to a point contact of the spherical surface of the roller, installed on one of the arms of the double-arm lever, with the profiled surface of projections of the ring-shaped member, which brings about great contact stresses leading to chipping out of the profiled cam material. The clearance between the valve stem face and the surface of the second arm of the double-arm lever of the motion transforming mechanism is unadjustable, which leads either to breaking of the arm of the double-arm lever, or to the burn-out of the valve locking member.

To alter the swept volume of engine cylinders, there is a two-chamber gear pump communicated with a lubrication source and, through a duct made in the cylinder head, with a cavity of the hydraulic cylinder intended for moving the swash plate. Radial forces originated in the gearings of the two-chamber pump bring about great bending stresses in the crankshaft which, being of a small diameter caused by the small parameter of the drive gear due to the necessity to obtain a high gear ratio, worsens considerably the performance of the machine as a whole, thes preventing it from being used as an internal combustion engine.

Work aimed at improving the motion-transforming mechanism of the axial-piston engine and, particularly, at decreasing its axial dimensions and excluding a point contact in the roller—cam pair has resulted in the appearance of the mechanism according to SU, A, 591597.

Said mechanism is intended for use in an axial-piston engine, whose frame houses a cylinder block with cavities whose axes are parallel to the shaft longitudinal axis, and which accommodate reciprocating pistons. Each piston is kinematically linked with the engine shaft for transforming the reciprocating motion of pistons into a rotary motion of the shaft. In its turn, this motion is transformed into a translational motion of the intake and exhaust valve stems. For this purpose, crankshaft has teeth of the drive gear meshing with those of the gear wheels. Gear wheels are mounted on bearings fitted on the axles installed in the frame. The teeth are in mesh with those made on the inner surface of the ring-shaped member. The latter is installed in plain bearings on the frame coaxially with the drive gear with a provision for rotating relative to its axle. The external surface of the ring-shaped member carries radial projections conjugate to the external cylindrical surface of the ring-shaped member. The projections lie in two planes, each of which is perpendicular to the axle of the ring-shaped member. Circumferentially, the projections of different planes are displaced from one another through the same angle. The surface of each profiled projection interacts with the respective surface of the single-arm lever linearly, since the axle of each single-arm lever is secured in the frame and located parallel to the axle of the ring-shaped member. The single-arm lever has a flat surface which interacts with the surface of one arm of the double-arm lever. The axle of the double-arm lever is secured in the frame and located perpendicularly to the axle of the single-arm lever. The other arm of each double-arm lever has a surface for interacting with the end face of the stem of the respective valve of the axial-piston engine. Said axial-piston engine is provided with a pump for feeding oil to its friction surfaces drive by the crankshaft through a pulley and a belt. Inasmuch as the space confined inside the cylindrical surface whose generatrix is formed by the valve stem axles, and whose guide is the curve passing through the centres of their axles, is occupied by the mechanism for transforming the rotary motion of the shaft of the axial-piston engine into the translational motion of stems of engine intake and exhaust valves, the pump is located radially beyond this space, which increases the overall dimensions and mass of the engine. Owing to the fact that the pump is made as a separate unit, lubricating oil is fed to the friction surfaces of engine parts from the pump, which tells adversity on dependability of its performance due to oil lears through joints of said pipelines.

SUMMARY OF THE INVENTION

The main object of the invention is to provide a mechanism for transforming the rotary motion of the shaft into the translational motion of actuating members wherein, owing to a structural change of the mechanical transmission, reliable supply of oil to friction surfaces of its parts would be ensured for extending its durability and simultaneously decreasing its mass and overall dimensions, which would enhance reliability and serviceability of the axial-piston engine.

This object is accomplished by providing a mechanism for transforming the shaft rotary motion into the translational motion of actuating members, comprising a frame intended for connection with the cylinder block, inside which, there is a cavity coaxial to the engine shaft intended for housing the shaft end connected with a drive gear meshing with the gear wheel installed in the frame and kinematically linked with a ring-shaped member having radial projections, said member being kinematically linked with actuating members wherein, according to the invention, the zone of engagement of the drive gear—gear wheel pair—communicates with the header of oil delivered to the friction surfaces, and the zone of this pair outside the engagement of the drive gear and the gear wheel communicates with a lubrication source.

Such a design of the mechanism for transforming the rotary motion of shaft into the translational motion of the actuating members ensures extends its service life and reduces its mass and overall dimensions due to an efficient supply of oil to the friction surfaces of the engine which is attained due to decreased hydrualic losses. The multi-sectional design of the pump also contributes to diminishing the size of the engine.

It is expedient that the zones A and B in the radial direction be limited by the frame walls, and in the axial direction, by the frame wall and the end face surface of a disc member secured on the frame at the side of the drive gear and gear wheel.

Such a structural arrangement of the mechanism for transforming the rotary motion of the engine shaft into the motion of the engine valve stems results in decreasing the axial dimension of the engine owing to imparting a function of the gear pump to the transforming mechanism. Besides, conditions for the pump operation have been improved, since its radial wall is brought closer to the outer surfaces of teeth of the gear and gear wheel, while its axial walls are represented by the wall of the mechanism body and by the disc member, which fact, essentially, eliminates unproductive flowing-over of lubricant.

With an increased number of engine cylinders, which brings about an increase in the ratio of the mechanism for transforming the rotary motion of its shaft into the translational motion of the valves, it is good practice to provide an intermediate member and place it in the frame coaxially to the gear wheel and connect it with the latter and the ring-shaped member.

Introduction of an intermediate member makes it possible to mesh the drive gear and the gear wheel with a sufficiently great modulus, which ensures sufficient feed of oil to the friction surfaces of engine parts.

Further on, it is preferable that the intermediate member be made in the form of a gear engaged with the ring-shaped member.

At a small number of gear teeth, this would ensure a small number of teeth made on the inner surface of the ring-shaped member, small size of the ring-shaped member and sufficient dimensions of the drive shaft, which would enhance rigidty of the shaft and, consequently, reliable operation of both said motion transforming mechanis, and the axial-piston engine, wherein this mechanism is used.

Besides, it is recommended that the gear of the intermediate member be made on the shaft and that it would be installed on two supports, one located in the frame and the other one, in a ring-shaped plate and that the gear wheel be connected with this shaft.

In this design of the transmission, where the gear is made integral with the shaft, both being essentially of the same diameter, the shaft is sufficiently rigid and bending stresses are low owing to the arrangement of bearings essentially along the faces of the gear wheel, which reduces the overall dimensions and mass of said mechanism at reliable operation of its gearings.

Finally, it is recommended that the oil header be formed by means of a ring-shaped groove made on the inner surface of the frame intended for enveloping the shaft in the zone of the intermediate member gear and one support of its shaft.

Arrangement of the header between the outer surface of the shaft of the axial-piston engine and gears of the intermediate member and supports of their shafts has reduced hydraulic losses owing to the shortest path of oil from the header to the shaft of the axial-piston engine through which oil is fed to the majority of the engine friction parts.

The above-mentioned considerations confirm the simplicity of the mechanism of transforming the rotary motion of the crankshaft into the translational motion of valve stems and the possibility to provide light and small axial-piston engines, particularly those with swept volumes of the cylinders varying in operation and ensuring efficient conversion of the combustion energy of fuel-air mixture into mechanical energy taken off the engine shaft.

BRIEF DESCRIPTION OF THE DRAWINGS

Other objects and advantages of the invention will become apparent from the description of the embodiments thereof with reference to the following drawings, wherein.

BEST MODE OF CARRYING OUT THE INVENTION

The mechanism for transforming the rotary motion of the shaft into the translational motion of actuating members, according to the invention, is realized on the basis of a 7-cylinder axial-piston I.C. engine.

Figure 1:
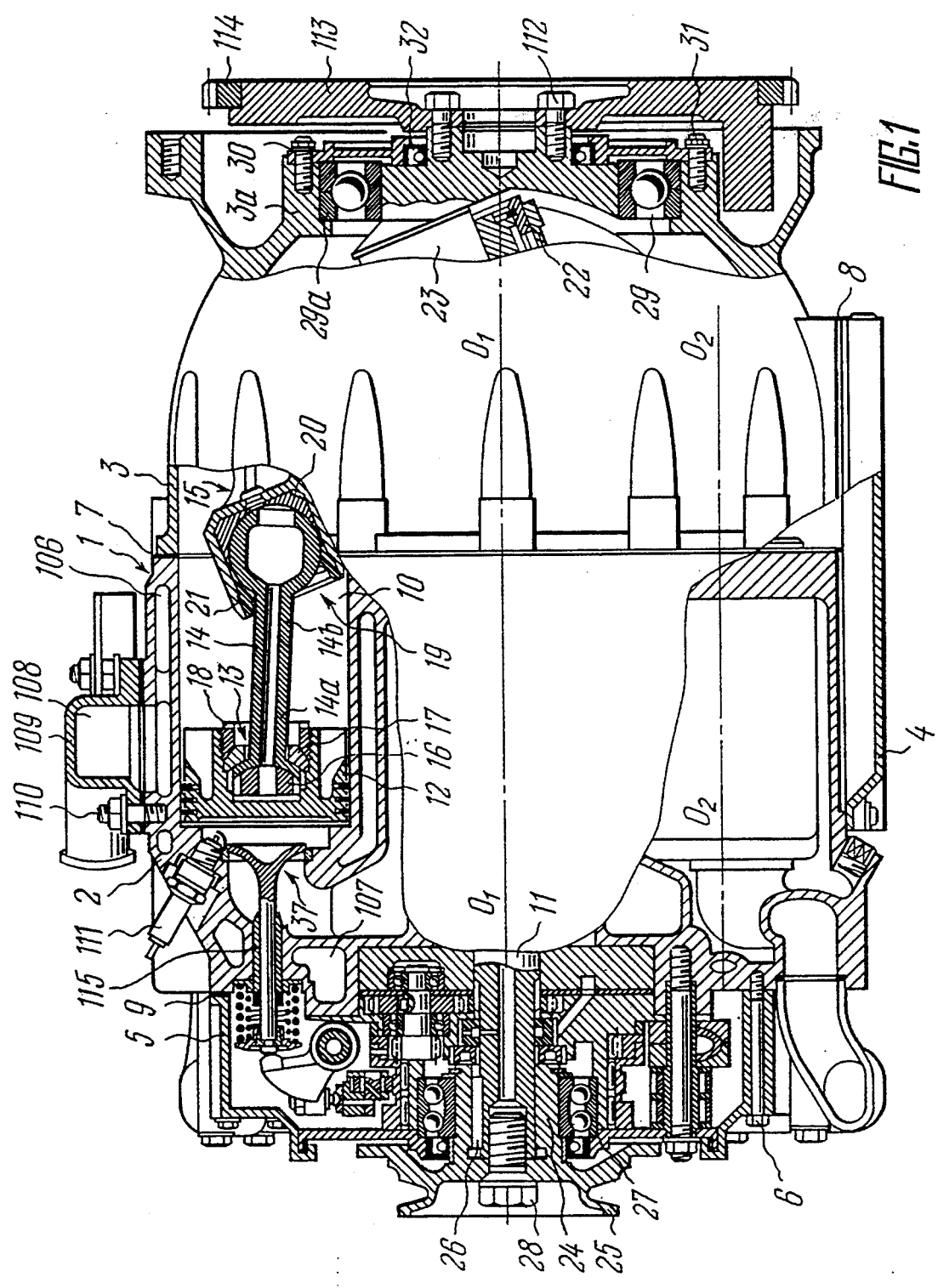
FIG. 1 schematically represents an axial-piston engine with a mechanism for transforming the rotary motion of the shaft into the translational motion of actuating members, according to the invention, with outaway sections.

This axial-piston engine comprises a frame 1 (FIG. 1), including a cylinder block 2 and a crankcase 3, interconnected by fastening elements (not shown). Attached to the cylinder block 2 and crankcase 3 is a sump 4. Attached at the side of the head of the cylinder block 2 by means of bolts 6 is a thin-walled box-section case 5. To prevent oil leaks, the following gaskets are provided: gasket 7 between the cylinder block 2 and crankcase 3, gasket 8 between the cylinder block 2 and sump 4, and gasket 9 between the cylinder block 2 and housing 5. Cylindrical cavities 10 are made in the cylinder block 2. Axles $0_2-0_2$ of the cylindrical cavities 10 are parallel to longitudinal axis $0_1-0_1$ of the engine crankshaft 11. The cylindrical cavities 10 accommodate reciprocating pistons 12. Each piston 12 is articulated with one end 14a of a rod 14 by means of a hinge joint 13, and the other end 14b thereof is hinged to a swash plate 15. The hinge joint 13 is formed by a liner 16 with a spherical surface which interacts with the spherical surface of the end 14a of the rod 14. To retain the rod 14, the piston 12 has a liner 17 whose axial motion is restricted relative to the piston 12 by a threaded bushing 18, connected by a screw joint with the piston 12. The hinge joint of the end 14b of the rod 14 with the swash plate 15 is represented by a ball head located in a cylindrical socket 19 made in the swash plate 15; the number of sockets equals the number of engine cylinders. Each socket 19 accommodates a liner 20 with a spherical surface which interacts with the surface of the ball head of the rod 14, and a threaded bushing 21 which retains the rod 14. The swash plate 15 is installed via a support 22 on the inclined journal 23 of the shaft 11. One end of the crankshaft 11 is connected with a hub 24 of a pulley 25 by a key 26. The hub 24 is installed in a double-row angular rolling contact bearing 27 located in the cover 5 and preventing axial displacement of the shaft 11. The hub 24 is secured on said shaft by a bolt 28. The other end of the shaft 11 is installed in a rolling-contact bearing 29 located in the flange 3a of the crankcase 3. The outer race 29a of the bearing 29 is secured in the flange 3a by a cover 30 connected with the flange 3a by a screw joint 31. Installed in the cover 30 is a collar 32 to prevent oil leakage from the crankcase 3. To prevent the swash plate 15 from turning relative to its axis, it is kinematically linked with the frame 1.

The housing 5 accommodates a casing 33 (FIG. 2) intended for accommodating the elements of the mechanism 34 for transforming the rotary motion of the shaft 11 into the translational motion of actuating members which are, essentially, stems 35 and 36 (FIG. 7) of intake 37 (FIG. 2) and exhaust 38 (FIG. 7) valves, respectively. The casing 33 (FIG. 2) is secured by pins 39 on the head of the cylinder block 2. On the side of the pulley 25, the housing 5 is closed with a cover 40, which has holes for the pins 39.

Figure 3:
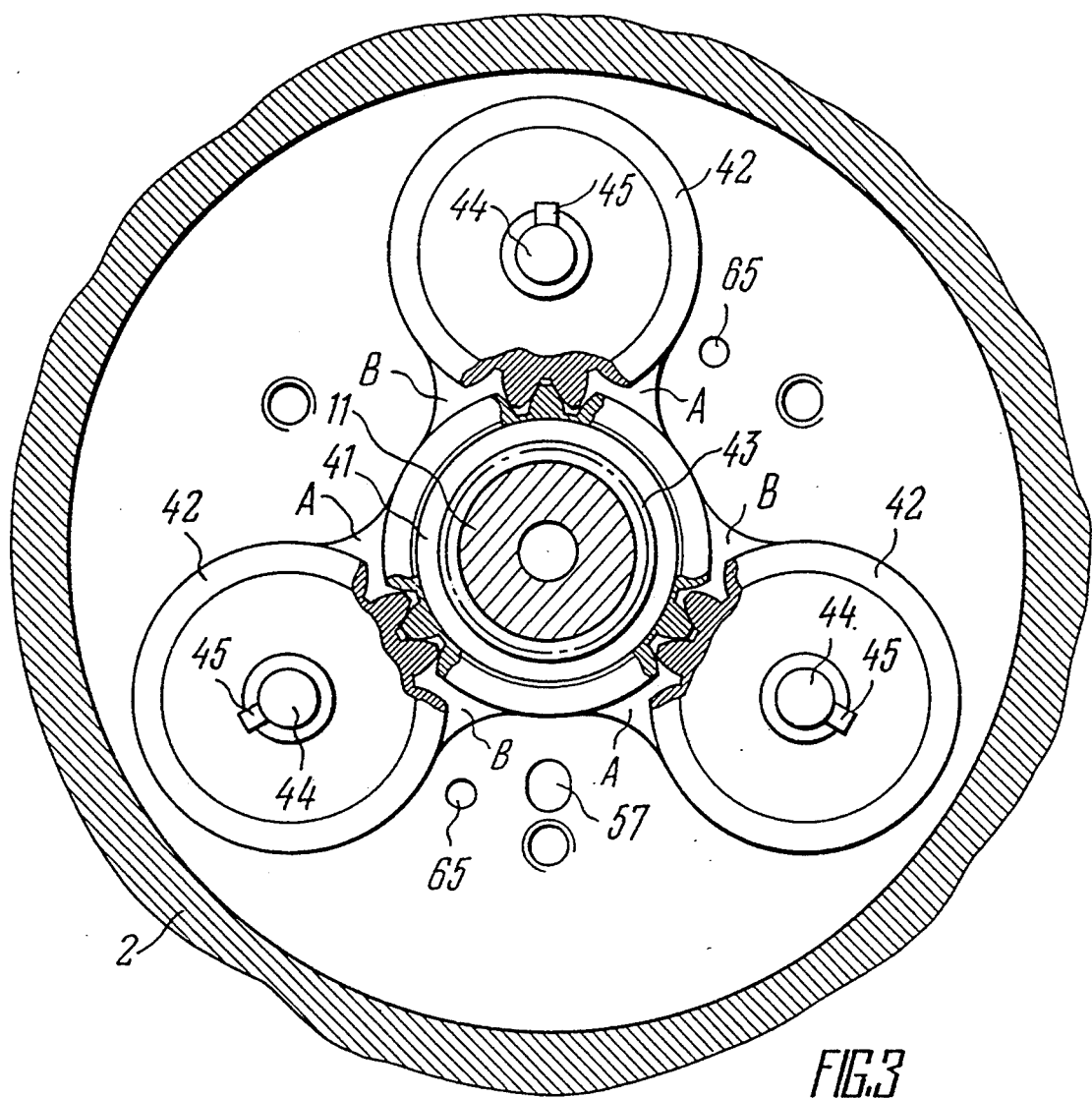
FIG. 3 is a view along arrow 3 in FIG. 2 of the drive gear meshed with gear wheels of the transforming mechanism, according to the invention.

The casing 33 is provided with a cavity which houses a drive gear 41 meshing with, for example, three gear wheels 42 (FIG. 3).

The gear 41 is connected with the shaft 11 by a splined joint 43. Each of the gear wheels 42 is installed on the shaft 44 and connected thereto by a key 45. Each shaft 44 is installed on two supports 46 and 47 (FIG. 2), made as ball bearings. The support 47 is arranged in the casing 33, and the support 46, in a ring-shaped plate 48 which has a central through hole 49 receiving the end of the shaft 11. The face surface of the plate 48, facing the gearing, carries a disc member 50 which serves as a wall of the transmission housing that defines zones A and B in the axial direction (FIG. 3), one of which (zone A) is a zone of engagement of the drive gear 41 with the gear wheel 42, and the other one (zone B) is a zone of the same pair outside the engagement of the driven gear 41 with the gear wheel 42.

Figure 2:
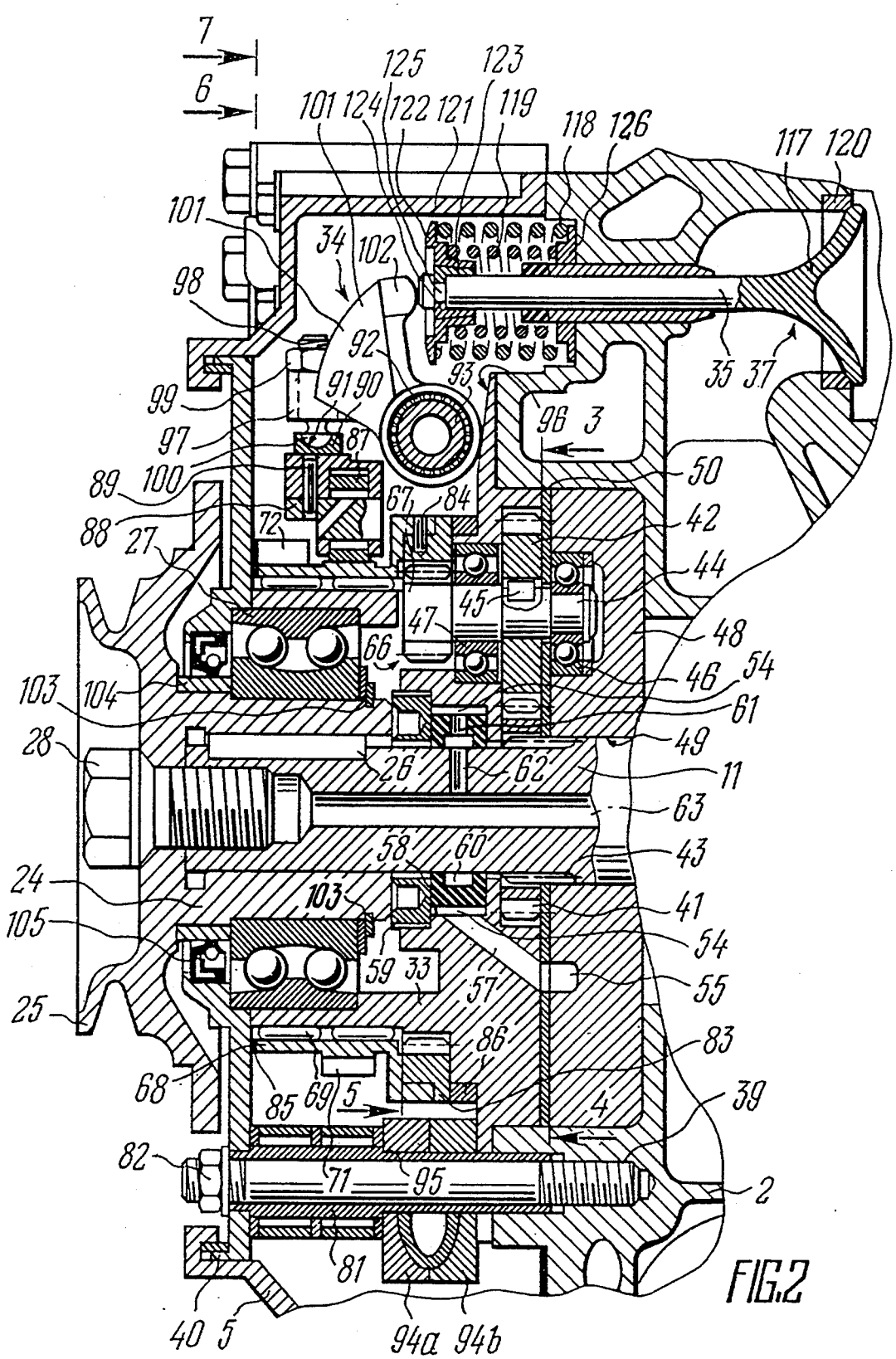
FIG. 2 is a mechanism for transforming the rotary motion of the shaft into the translational motion of valve stems, according to the invention, longitudinal section enlarged.
Figure 4:
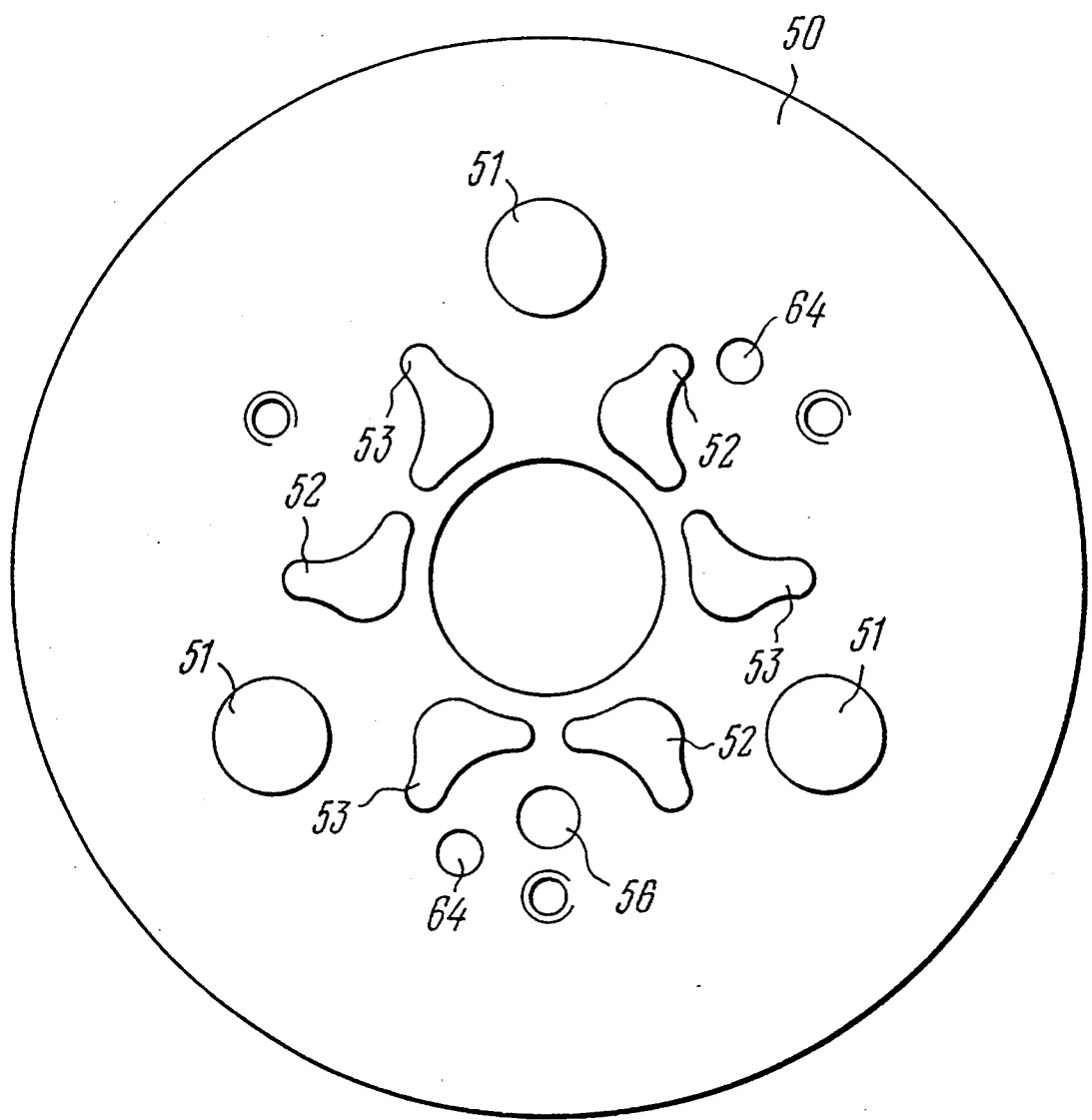
FIG. 4 is a view along arrow 4 in FIG. 2 of the disc member, according to the invention.

The disc member 50 has uniformly arranged holes 51 (FIG. 4) for the passage of the ends of the shafts 44 (FIG. 2) on which supports 47 are installed. Besides, the disc member 50 prevents contact of stationary outer bearing races of supports 46 with movable face surfaces of the gear wheels 42. Formed in the disc member 50 in the zone of the pitch circle of the gear 41 are shaped ports 52 (FIG. 4) equispaced in the circumferential direction, each whereof is communicated with a source of lubricant (Not shown in the Figure) and with zone B, and shaped ports 53 equispaced circumferentially between the ports 52, each port 53 communicating with the header 54 (FIG. 2). The latter is a circular groove formed in the inner surface of the casing 33, facing the shaft 11. Arranged on the end face surface of the disc member 50 are ports 52 (FIG. 4) and 53 of each toothed pair 41 and 42 symmetrically with respect to the plane passing through the axes of the gear 41 (FIG. 2) and gear wheel 42. The ring-shaped plate 48 has a system of oil inlet and outlet channels (not shown in the Figure). The oil inlet channels communicate with the ports 52 (FIG. 4), while the oil outlet channels, with the ports 53. The oil outlet channels (not shown in the Figure) communicate through the duct 55 (FIG. 2) with a through hole 56 (FIG. 4) made in the disc member 50 and communicating with the inlet hole of the channel 57 (FIG. 2). The latter is made in the casing 33. The outlet hole of said channel communicate with the header 54. To prevent leakage of oil from the header 54, the surface of the end of the shaft 11 towards the hub 24 of the pulley 25 has, a fluoroplastic bushing 58 arranged in the cavity of the header 54. Axial displacement of the bushing 58 is limited by a threaded bushing 59 screwed into the casing 33. The bushing 58 has a cylindrical cavity 60 communicated through radial channels 61 with the header 54 and with radial channels 62 made in the shaft 11 and communicating with its central longitudinal channel 63, which ensures delivery of oil to friction surfaces of engine parts. Provided in the disc member 50 (FIG. 4) are holes 64 through which pins 65 (FIG. 3) press-fitted into the casing 33 pass. Said pins 65 prevent angular displacement of the disc member 50 (FIG. 2).

Inasmuch as the axial-piston engine has seven cylinders, and the gear ratio of the mechanism 34 for transforming the rotary motion of the shaft 11 into the translational motion of the valves 37 and 38 should equal 6, then, to retain the minimum radial dimension of the mechanism 34, there is an intermediate member 66 which is, essentially, a gear 67 on the shaft 44, arranged in the casing coaxially with the gear wheel 42 and meshing with a ring-shaped member 68.

Figure 5:
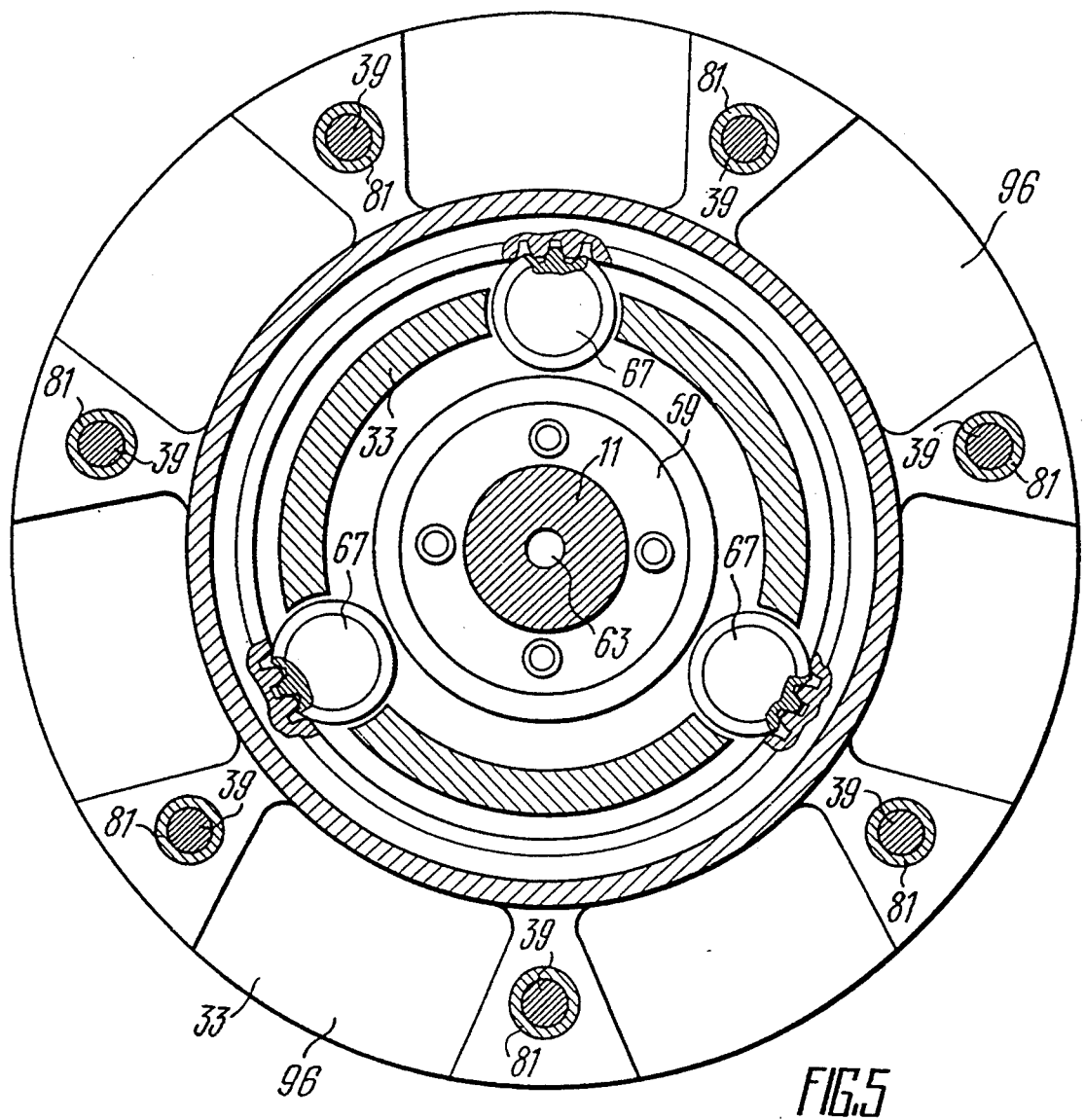
FIG. 5 is a view along arrow 5 in FIG. 2 of the engagement of intermediate element gears with the teeth of the ring-shaped member of the motion-transforming mechanism, according to the invention.

To decrease radial load applied to the ring-shaped member 68 by the force developed in the gearing, use is made of three gears 67, each being made on the respective shaft 44 (FIG. 5).

The ring-shaped member 68 is installed on the casing 33 (FIG. 2) on needle bearings 69. Arranged coaxially with the shaft 11 on the outer surface 70 (FIG. 6) of the ring-shaped member 68, are radial projections 71 and 72, mating with the outer cylindrical surface 70 of the ring-shaped member 68 and separated from one an other at a certain distance along the generatrix of the cylindrical surface 70. The projections 71 and 72 are displaced circumferentially from each other through the same angle. The rotary motion of the ring-shaped member 68 into the translational motion of stems of each intake and exhaust valve, is transformed by a kinematic linkage 73 (FIG. 2).

Figure 6:
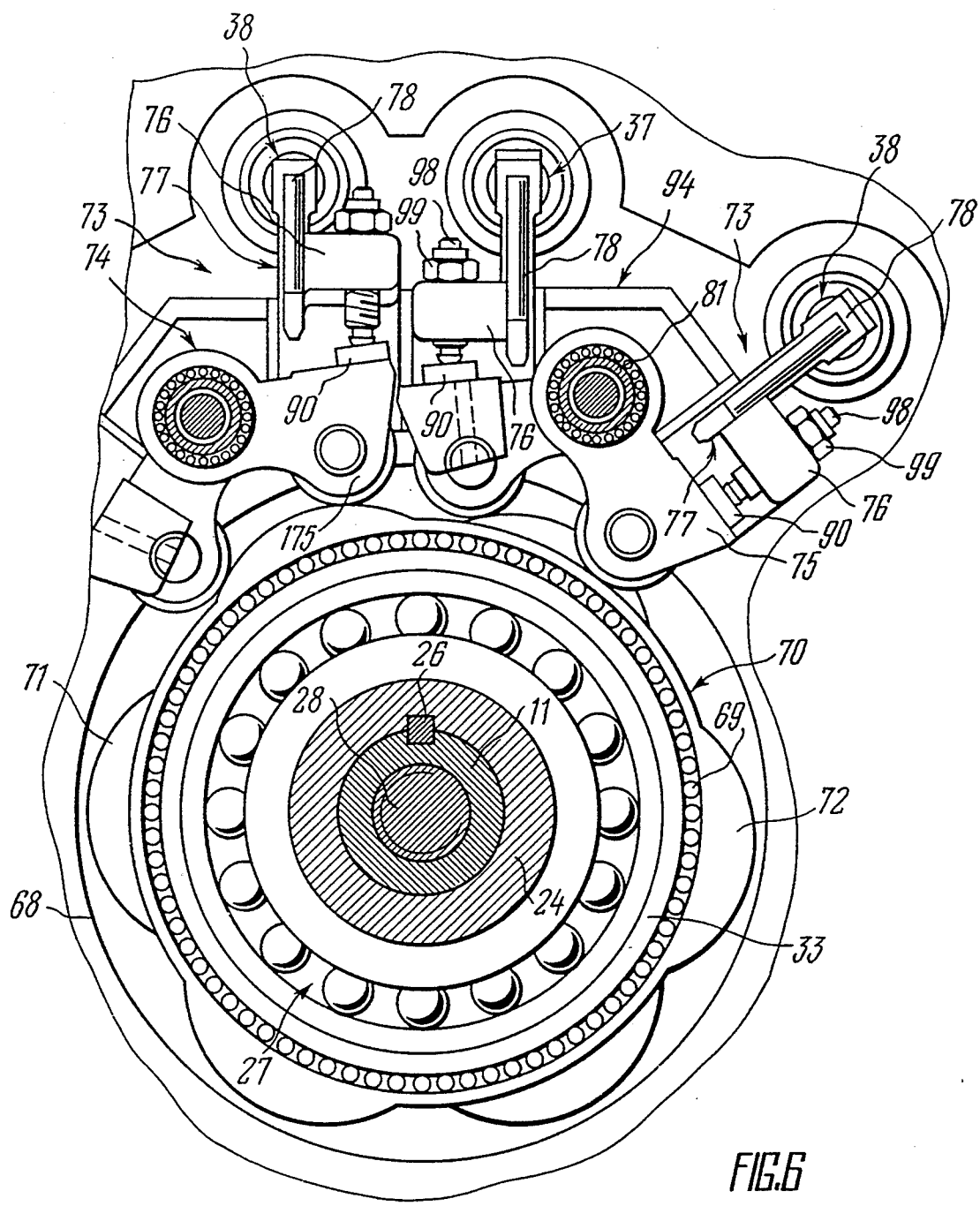
FIG. 6 is a view along arrow 6 in FIG. 2 of the mechanism for transforming the rotary motion of the crankshaft into the translational motion of valve stems, with cover removed, according to the invention.

The kinematic linkage 73 is formed by a single-arm lever 74 (FIG. 6), hinged to the casing 33 (FIG. 2), its free end 75 (FIG. 6) interacts with one arm 76 of the double-arm lever 77, whose other 78 interacts with the stem 35 of the valve 37 (FIG. 2) or with the stem 36 of the exhaust valve 38 (FIG. 6).

The axle 81 of each single-arm lever 74 is secured in the casing 33 (FIG. 2), its geometrical axis being parallel to that of the ring-shaped member 68. The axle 81 is hollow, and accommodates the pin 39. The axle 81 is located in a hole of the cylinder head 2 and is pressed between the cylinder head 2 and the cover 40 by a nut 82, screwed on the threaded end of the pin 39. The face surface of the ring-shaped member 68 facing the supports 46 and 47 has a circular groove installed wherein is a toothed rim 83 whose axle is coaxial to the axle of the drive gear 41. Relative circumferential displacement of the ring-shaped member 68 and the gear ring 83 is prevented by pins 84 press-fitted into their bodies. A washer 85 is placed between the face surfaces of the ring-shaped member 68 and cover 40. The washer 85 limits the axial displacement of the needle bearings 69. Axial displacement of the ring-shaped member 68 is prevented by a distance sleeve 86. The latter is installed on the outer cylindrical surface of the casing 33 mad coaxially with the shaft 11, and one of its end faces bears against the gear rim 83, while the other one against the wall of the casing 33. To reduce the friction force in the zone of interaction of the ring-shaped member 68 with a single-arm lever 74, the latter is provided with a roller 87. The roller 87 is connected with the lever 74 by an axle 88. Axial and radial displacements of the axle 88 are prevented by a pin 89 press-fitted into the bodies of the lever 74 and the axle 88. The free end of the lever 74 at the side opposite to the roller 87 carries a thrust bearing 90 with a spherical surface 91. Each double-arm lever 77 is mounted in a needle bearing 92 on an axle 93 whose diametrical plane is positioned square to the axis of the shaft 11. Each axle 93 of the double-arm lever 77 is located in a bracket 94 (FIG. 6) which has a vertical joining plane. The stationary position of parts 94a nd 94b (FIG. 2) of the bracket 94 is ensured by the axle 81 which passes through the holes in the parts 94a and 94b. The parts 94a and 94b of the bracket 94 are kept against axial displacement by a collar 95 made on the outer surface of the axle 81 under the action of a force developed in the threaded joint of the pin 39 and nut 82.

Figure 7:
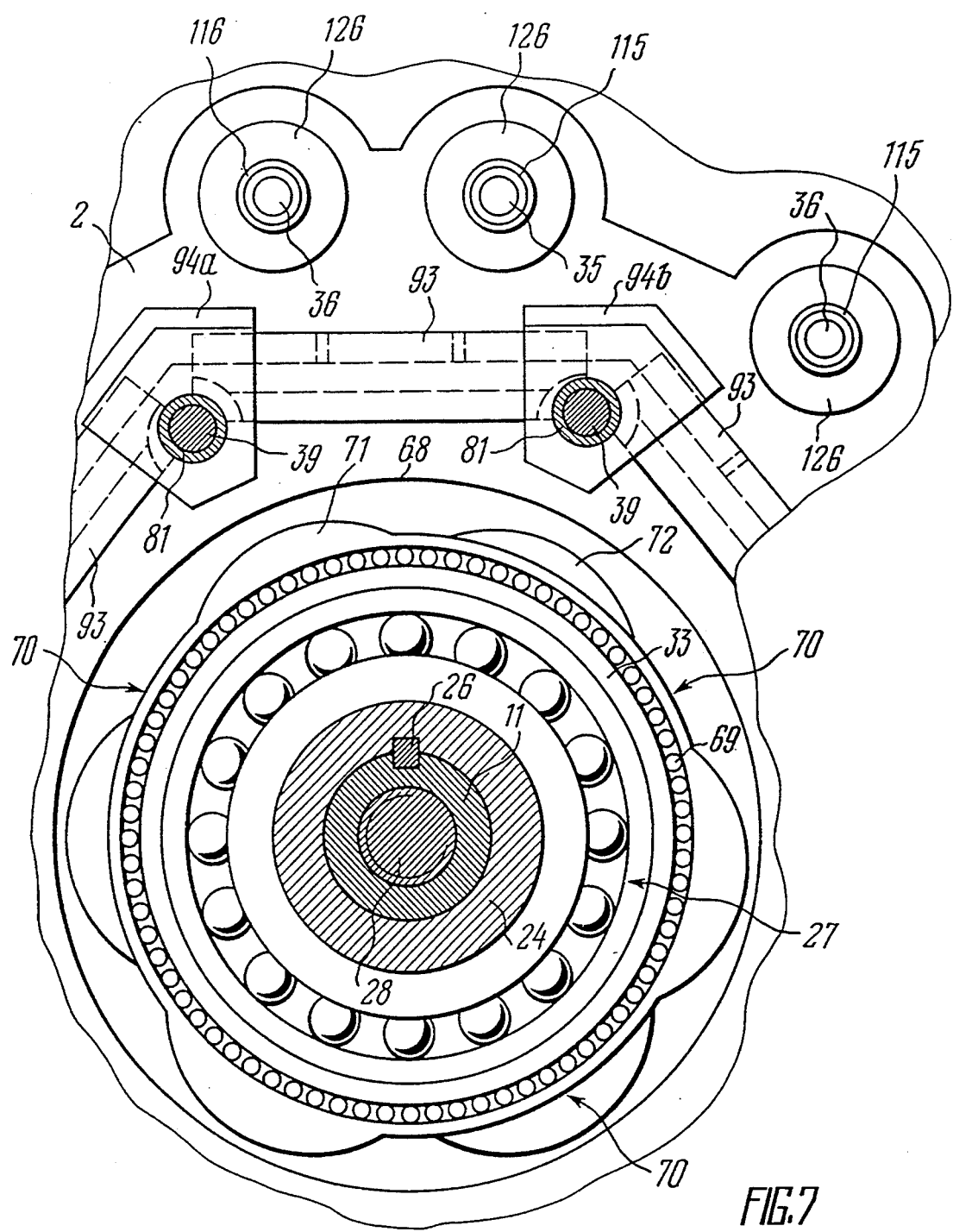
FIG. 7 is a view along arrow 7 of the brackets connected by an axle with the levers removed, and exhaust and intake valves with the bushings and springs removed, according to the invention.

The brackets 94 are equispared around the circumference, being interconnected by axles 93 (FIG. 7). In roder to reduce the axial and radial dimensions of the mechanism 34 (FIG. 2), its casing 33 is provided with recesses 96 to receive the body of the lever 77. The arm 78 (FIG. 6) of the lever is a plate whose longitudinal plane is perpendicular to the axle 93 of the lever 77. The other arm 76 is, essentially, perpendicular to the arm 78 and has the term of a bracket with a through threaded hole 97 (FIG. 2). The latter receives a threaded rod 98 which is fixed by a nut 99 relative to the lever 77. The end of the rod 98, facing the thrust bearing 90, has a ball head 100 whose surface interacts with a spherical surface of the thrust bearing 90. To improve rigidity of the lever 77, a rib 101 is provided between the arms 76 and 78 of the lever 77. The arm 78 of this lever 77 carries a boss 102 interacting with the stem 35 of the valve 37. The outer race of the bearing 27 is installed in the casing 33 of the mechanism 34, whereas its inner race is installed on the hub 24 of the pulley 25. To prevent axial displacement of the lower race of the bearing 27 relative to the hub 24, a retaining ring 103 and a bushing 104 are provided. To prevent oil leakage from the bearing 27, a collar 107 is provided in the cover 40, interacting with the outer surface of the bushing 104. The cylinder block 2 has a cavity 106 (FIG. 1) of the machine cooling system, communicating with a cavity 107 in the head of the cylinder block 2, and a cavity 108 of the coding a branch pipe 109 secured on the cylinder block 2 with fasteners 110. Installed in the head of the cylinder block 2 are spark plugs 111 for each cylinder and reciprocating stems 35 of the intake valves 37 and stems 36 (FIG. 7) of the exhaust valves 38.

Secured by bolts 112 on the crankshaft 11 (FIG. 1) in the zone of the flange 3a is a flywheel 113 with a ring gear 114 intended for connection with a starting device (not shown in the Figure).

The stems 35 and 36 (FIG. 7) of the valves 37 (FIG. 1) and 38 (FIG. 7) are installed in bushings 115 (FIG. 1) and 116 (FIG. 7), each secured in the cylinder block 2. A locking member 117 (FIG. 2) of each valve 37 and 38 (FIG. 7) is made of a poppet-like form. The locking member 117 (FIG. 2) is pressed by springs 118 and 119 against a seat 120 arranged in the cylinder block 2. One end of the spring 118 rests on the face of the head of the cylinder block 2, while its other end, on a flange 121 of a cone-shaped bushing 122. The bushing 122 receives retaining blocks 123. The conical surface of the retaining blocks 123 interacts with a respective conical surface of the bushing 122, and their projections 124 are located in a circular groove 125 made in each stem 35 and 36 of the valves 37 and 38. One end of the spring 119 rests on a washer 126, while its other end, on the flange 121 of the bushing 122.

The mechanism for transforming the rotary motion of the crankshaft into the translational motion of stems of the intake and exhaust valves, made according to the invention and used in a seven-cylinder axial-piston engine, functions as follows.

When the engine is being started, the toothed element (pinion) of the starting device (not shown in FIG. 1) gets in mesh with the ring gear 114 (FIG. 1) of the flywheel 113 and rotates it. The flywheel 113 sets the crank-shaft 11 in rotation. The compound motion of the inclined journal 23 of the shaft 11 is transferred via the support 22 to the swash plate 15. When the swash plate 15 is in motion, the spherical surface of the liner 20 interacts with the spherical surface of the end 14b of the rod 14 and pulls said rod 14 to the right, as presented in the drawing. The other end 14a of the rod 14 interacts through its spherical surface with the spherical surface of the liner 17. The latter interacts through its spherical surface with the spherical surface of the threaded bushing 18 which transmits the effort to the piston 12. The fuel-air mixture is fed through the opened intake valve 37 (not shown in the Figure) into the cavity 10 of that cylinder in which the piston 12 moves to the right. After the shaft 11 has turned through an angle of 180° the swash plate 15 starts movement towards the head of the cylinder block 2 of the frame 1 in the plane passing through the axes of the cylinder and machine. In the course of its movement, the liner 20 interacts, by its other spherical surface, with the other spherical surface of the end 14b of the rod 14, and push said rod 14 to the left. The other end 14a of the rod 14 interacts through its spherical surface, with the spherical surface of the liner 16. The latter transmits the force to the piston 12 and shifts it to the left into the position shown in FIG. 1. The intake valve 37 is closed. A decrease in volume of the cavity 10 is accompanied by compression of the fuel-air mixture. In the TDC zone an the fuel-air mixture is ignited by the spark plug 111. During combustion of the fuel-air mixture, the burning gases expand, which results in an increase of the gas pressure acting, in particular, on the surface of the piston 12 which faces the spark plug 111. The force developed by the pressure of hot gases moves the piston 12 to the right, as shown in the drawing. The translational motion of the piston 12 brings about a compound motion of-the swash plate 15 which transforms it into the rotary motion of the shaft 11. As the rotation speed of the shaft 11 grows, the pinion of the starting device disengages from the ring gear 114. The engine starting period is completed and the engine starts running idle.

When the shaft 11 rotates, the teeth of the drive gear 41 rotate three gear wheels 42 (FIG. 3). The oil delivered from its source (not shown in the Figure) is fed through the ports 52 (FIG. 4) into the zone B outside the gearing. Then, oil is entrained by the teeth of the gear 41 (FIG. 3) and gear wheels 42, which are out of engagement, in the direction of a vector of their peripheral velocity. Next, oil flows along the walls of the casing 33 into the meshing zone of the gear 41 and gear wheels 42, i.e. to zone A.

When the teeth of the drive gear 41 and gear wheels 42 get in mush, oil is squeezed from their tooth spaces and is fed to the ports 53 (FIG. 4) wherefrom it flows through a system of oil discharge channels (not shown in the Figure) to the channel 55 (FIG. 2). From the channel 55 oil is fed through the hole 56 (FIG. 4) to a channel 57 (FIG. 2) and further to the oil header 54. From the header 54 oil is fed through radial channels 61 to the cylindrical cavity 60, wherefrom it flows through the radial channels 62 of the shaft 11 into its channel 63. From the channel 63 of the shaft 11 the oil is supplied to the friction surfaces of engine parts. In the disclosed engine the transforming mechanism 34 is, essentially, a three-chamber gear pump in which each zone B outside the engagement of the drive gear 41 (FIG. 3) with the gear wheels 42 is communicated with the source of lubrication, and each zone A of engagement of these toothed pairs communicates with the oil header 54 (FIG. 2), which fact has considerably extended the service life of the mechanism 34 and ensured intensive oil supply to the friction surfaces of engine parts.

Rotation of the gear wheels 42 (FIG. 2) has brought about rotation of the shafts 44 and gears 67 of the intermediate members 66. Rotation of the gears 67 results in the rotation of the ring-shaped member 68. When the latter is rotating, its projections 72 interact with the roller 87 of the single-arm lever 74. As a result of the above interaction the free end 75 of the single-arm lever 74 turns through a certain angle of relative to the axle 81. The spherical surface 91 of the thrust bearing 90 interacts, with the spherical surface of the ball head 100 of the threaded rod 98, displacing the latter. The displacement of the rod 98 moves the arm 76 and, turns the double-arm lever 77 about its axle 93. When the other arm 78 of the double-arm lever 77 turns through a certain angle, its boss 102 (FIG. 2) interacts with the stem 35 of the intake valve 37. Overcoming the force of springs 118 and 119, the double-arm lever 77 moves the stem 36 so that the locking member 117 withdraws from the seat 120, thus forming a circular passage for the discharge of exhaust gases which leave the cavity 10. The open position of the exhaust valve 38 corresponds to the closed position of the intake valve 37 in the same cylinder which is ensured by interaction of the roller 87 of the single-arm lever 74 with the cylindrical outer surface 70 of the ring-shaped member 68. After the discharge of exhaust gases, the cycle is repeated as described above.

Industrial Applicability

The seven-cylinder axial-piston engine, realized according to the invention with a displacement of 4.65 l, a bore of 92 mm and a piston stroke of 100 mm has a longitudinal dimension of 630 mm, a 260 mm diameter of the circumference on which the cylinder centres are located, demonstrated reliable operation of all the elements and parts of the mechanism for transforming the rotary motion of the crankshaft into the translational motion of valve stems. Besides, arranged within the dimensions of the disclosed transforming mechanism are the front support in the form of a two-row angular ball bearing of the crankshaft and a multi-chamber gear-type oil pump.

We claim:

1. A mechanism for transforming rotary motion of a shaft into a translational motion of actuating members, comprising a casing (33) adapted for connection with a cylinder block (2) of an engine, said casing having a cavity coaxially formed relative to an engine shaft (11) and receiving an end of the shaft (11) on which a drive gear (41) is connected, said drive gear being in mesh with a gear wheel (42) installed in the casing (33) and kinematically connected to a ring-shaped member (68) having external radial projections (71, 72) and an internal ring gear (83) and kinematically connected to actuating members, and wherein a first zone (A) of engagement of the drive gear (41) and gear wheel (42) communicates with a header (54) of oil fed to friction surfaces, while a second zone (B) outside the engagement of the drive gear (41) with the gear wheel (42) communicates with a lubrication source.

2. A mechanism for transforming the rotary motion of the shaft into the translational motion of actuating members according to claim 1, wherein the zones (A) and (B) are defined in a radial direction by a wall of the casing (33), and in an axial direction, by said wall of the casing (33) and an end surface of a disc member (50) secured on the casing (33) at a side thereof facing the drive gear (41) and the gear wheel (42).

3. A mechanism for transforming the rotary motion of the shaft into the translational motion of actuating members according to claim 2 further comprising an intermediate member (66) arranged in the casing (33) coaxially with the gear wheel (42) and connected with the latter and the ring-shaped member (68).

4. A mechanism for transforming the rotary motion of the shaft into the translational motion of actuating members according to claim 3 wherein said intermediate member (66) comprises a gear (67) in mesh with said ring gear (83) of the ring-shaped member (68).

5. A mechanism for transforming the rotary motion of the shaft into the translation motion of actuating members according to claim 4 wherein teeth of the gear (67) of the intermediate member (66) are integral with a shaft (44), a gear wheel (42) being on said shaft (44), supports being provided (46, 47) for said shaft (44), one of said supports (47) being located in the casing (33) while the other support (46) is located in a ring-shaped plate (48) which is in contact with a disc member (50) and rests against said wall of the casing (33).

6. A mechanism for transforming the rotary motion of the shaft into the translational motion of actuating members according to claim 5, wherein said header (54) is formed as a ring-shaped recess provided in the inner surface of the casing (33) and embracing the shaft (11) in the vicinity of the gear (67) of the intermediate member (66) and said one support (47) of shaft (44).

* * * * *